United States Patent [19]
Kising et al.

[11] Patent Number: 5,637,947
[45] Date of Patent: Jun. 10, 1997

[54] METHOD AND APPARATUS FOR OPERATING A GENERATOR SUPPLYING A HIGH-FREQUENCY POWER TO AN ULTRASONIC TRANSDUCER

[75] Inventors: Jürgen Kising, Glattbach; Gerd Reitmayer, Aschaffenburg, both of Germany; Mato Modric, Rovinj, Croatia

[73] Assignee: Technologies GmbH & Co. Branson Ultraschall Niederlassung der Emerson, Germany

[21] Appl. No.: 368,328

[22] Filed: Jan. 4, 1995

[30] Foreign Application Priority Data

Jan. 5, 1994 [DE] Germany .................. 44 00 210.6

[51] Int. Cl.⁶ .................. H03L 7/00; H03H 9/00
[52] U.S. Cl. .................. 310/316
[58] Field of Search .................. 310/316, 317

[56] References Cited

U.S. PATENT DOCUMENTS

| | | | |
|---|---|---|---|
| 3,819,961 | 6/1974 | Bourgeois et al. | 310/316 |
| 4,275,363 | 6/1981 | Mishiro et al. | 331/4 |
| 4,277,710 | 7/1981 | Harwood et al. | 310/316 |
| 4,560,998 | 12/1985 | Wimmer | 310/317 |
| 4,687,962 | 8/1987 | Elbert | 310/316 |
| 4,748,365 | 5/1988 | Poupaert et al. | 310/316 |
| 4,808,948 | 2/1989 | Patel et al. | 331/4 |
| 4,879,528 | 11/1989 | Gotanda | 310/316 |
| 4,973,876 | 11/1990 | Roberts | 310/316 |
| 5,001,442 | 3/1991 | Hanaie et al. | 310/316 |
| 5,026,387 | 6/1991 | Thomas | 606/169 |
| 5,170,929 | 12/1992 | Long et al. | 228/102 |
| 5,192,889 | 3/1993 | Myohga | 310/316 |
| 5,199,630 | 4/1993 | Fleber et al. | 228/102 |
| 5,315,533 | 5/1994 | Stich et al. | 364/480 |
| 5,460,595 | 10/1995 | Hall et al. | 310/316 |

FOREIGN PATENT DOCUMENTS

| | | | |
|---|---|---|---|
| 0217694 | 8/1987 | European Pat. Off. | B06B 1/02 |
| 0246528 | 11/1987 | European Pat. Off. | B06B 1/02 |
| 0247752 | 12/1987 | European Pat. Off. | B06B 1/02 |
| 0270819 | 6/1988 | European Pat. Off. | B60B 1/02 |
| 0359217 | 3/1990 | European Pat. Off. | A61F 9/00 |
| 0498936 | 8/1992 | European Pat. Off. | |
| 0572059 | 12/1993 | European Pat. Off. | |

*Primary Examiner*—Thomas M. Dougherty
*Attorney, Agent, or Firm*—Polster, Lieder, Woodruff & Lucchesi

[57] ABSTRACT

The invention relates to a method for a unique control of the frequency and output power of a digital generator, in particular for an ultrasonic welding process. Based on a digital processing, the method according to the present invention compensates not only for variations of the resonant frequency in a broad range, but further provides to control a shifting of the resonant point during the welding process in response to temperature or pressure variations. Power variations caused by variations of the line supply voltage or by the pressure are detected and levelled out by the software. The software monitors the overall operation of in-line machinery, matches its parameters and monitors the complete cycle. The software further ensures an optimum efficiency and effectively protects the end stage against stress caused by high-reactive currents.

22 Claims, 5 Drawing Sheets

METHOD AND APPARATUS FOR OPERATING A GENERATOR SUPPLYING A HIGH-FREQUENCY POWER TO AN ULTRASONIC TRANSDUCER

The present invention relates to a method and an apparatus for operating a generator supplying a high-frequency power to an ultrasonic transducer which is operated at a determined resonant frequency, in particular for ultrasonic welding, wherein the phase angle between the current and the voltage at the output of the generator is measured and utilized for a frequency control of the generator.

The prior art is described in a number of patents, for example in U.S. Pat. No. 4,973,876. The high-frequency energy driving the ultrasonic transducer will be thus generated by a pulse width modulated converter and the frequency of the converter will be controlled as a function of the phase angle between the current and the voltage at the output of the HF generator. The control circuit operates in an analogue fashion and correspondingly requires an additional expenditure, particularly to filter the current signal to be processed in a phase lock circuitry to control the generator frequency to a value for which the phase angle between the current and the voltage has a zero crossing which characterizes the resonant condition.

The drawbacks of those self-exciting generators according to the prior art are obvious:

The control acts blind, i.e. the characteristics of the acoustic system are not known. This may result in stimulating spurious resonances which is not desired.

The control process is inflexible, i.e. it is not able to match the physical characteristics of the transducer system in order to obtain optimum control features. Thereby problems may occur with high or low quality transducers or with transducers showing a very steep transition between a series and a parallel resonant condition.

The tuning range may not be varied which creates a problem for undesired spurious resonances since these cannot be tuned-out.

The tuning range must be preset to be as close as possible to the operating frequency, since otherwise the high reactive current share in the interstage results in overloading.

Accordingly, it is an object of the present invention to provide a method as well as an apparatus for determining and adjusting the frequency of the generator to the desired resonant frequency in a fast and more reliable fashion, even for complex systems. It is a further object to improve and to particularly stabilize the control process and to obtain an optimum matching to the ultrasonic system.

According to these and other objects of the present invention, there is provided a method comprising the steps of claim 1 and an apparatus comprising the features of claim 24. Further beneficial embodiments and details of the present invention are claimed in the subclaims.

According to the invention, the frequency control of the generator is not only based on the phase angle, but in addition to supplemental control values such as current, voltage, apparent power and active power. Processing and combining these parameters are digitally performed in a microcontroller which is able due to its capacity to registrate and to evaluate quite a number of parameters in addition to the phase angle and to generate therefrom the proper control value for driving the generator. Thus, the selection of the appropriate parameters and the allowed ranges for the parameters as well as matching the measuring resolution to the acoustic characteristics of the system are of paramount meaning for the optimum frequency control and frequency tracking. After all, the combination of a plurality of measured quantities alone yields a controlling process which is able to determine and to adjust the resonant frequency under optimum conditions to thus avoid the stimulation of undesired spurious resonances.

A frequency tracking which is not able to readjust the resonant frequency subjected to changing during the welding process, will automatically result in a high-reactive current in the end stage of the generator which will be destructive to the output power transistors.

Alike, a control which is able to track the resonant frequency, but on the condition of a high-phase angle, will produce more reactive power than active power resulting again in an increased stress in the output stage.

Therefore, the physically appropriate control is defined by a process utilizing the phase angle as a control quantity and further combinations of the phase angle with other values such as apparent power, current and so on.

The digital phase control is further able to adjust systems which do not show a phase zero-crossing, thus broadening the applications of the invention as compared to an analogue phase control. In this case (no phase zero-crossing) controlling aims towards a phase minimum or a phase zero-crossing may be simulated by a phase-offset.

Measuring the current signal versus frequency under idle condition delivers an information with respect to the location of the resonant point and accidentally present spurious resonances to the micro-controller. Accordingly, the micro-controller can define the tuning range such that any manual setting is eliminated.

Accordingly, the central aim of the present invention is directed to finding the acurate operating point and to provide an optimum tuning.

BRIEF DESCRIPTION OF THE DRAWINGS

Figure 1:
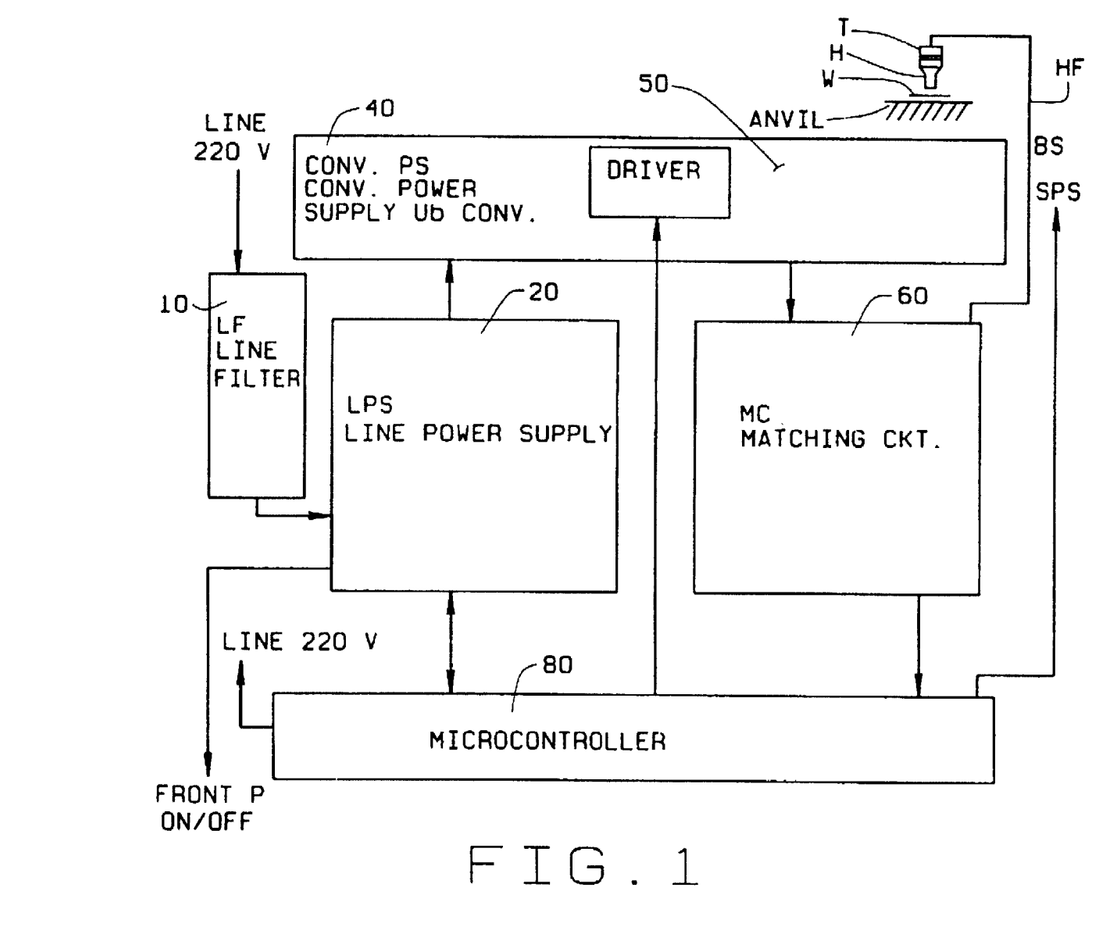
FIG. 1 is a schematic block diagram of a digital generator of the present invention.

FIG. 1 shows a complete diagram of the digital generator, substantially comprising five modules:

- a line filter 10 to protect the line voltage source against high frequency interferences;
- the main power supply 20 for supplying power to the individual components;
- an end stage 50 including a shifter 40 for generating an output power and output frequency determined by the micro-controller;
- a match box 60 for matching to the impedance of the ultrasonic transducer;
- the micro-controller 80 for controlling the welding process and monitoring the generator electronics.

The line voltage passes through the line filter 10 to the main or line power supply 20. The line power supply 20 delivers a supply voltage of 300 V to the shifter 40 and signalizes its ON-condition to the micro-controller 80 such that the end stage 50 will be activated by the micro-controller 80 only then, when all components have set-up their voltage of operation. Only then, a defined condition is obtained allowing the control of the generator by means of the micro-controller.

The shifter 40 may be described to be a vibrato or oscillator to transform the DC-voltage applied by the line power supply 20 into a pulse frequency sequence where the pulse width determines the output amplitude.

The shifter 40 conditions the DC-voltage and thus the power to be delivered by the end stage 50. The output power is determined by the micro-controller by modulating the pulse width generated by the shifter.

The output of the end stage is eventually matched for impedance to the transducer system by means of the match box 60. The transducer system referred to comprises an ultra-sonic transducer T in combination with an amplitude transformer such as a horn H. The end stage 50 returns an information with respect to the delivered power and the oscillating frequency to the micro-controller 80. The micro-controller has the function to determine the optimum operating point by utilizing the information as to current and voltage signalized by the output of the match box 60 and to deliver the proper energy for the welding process. Furthermore, the micro-controller controls the ON-condition and the permissible current values flowing in the various components.

Figure 2:
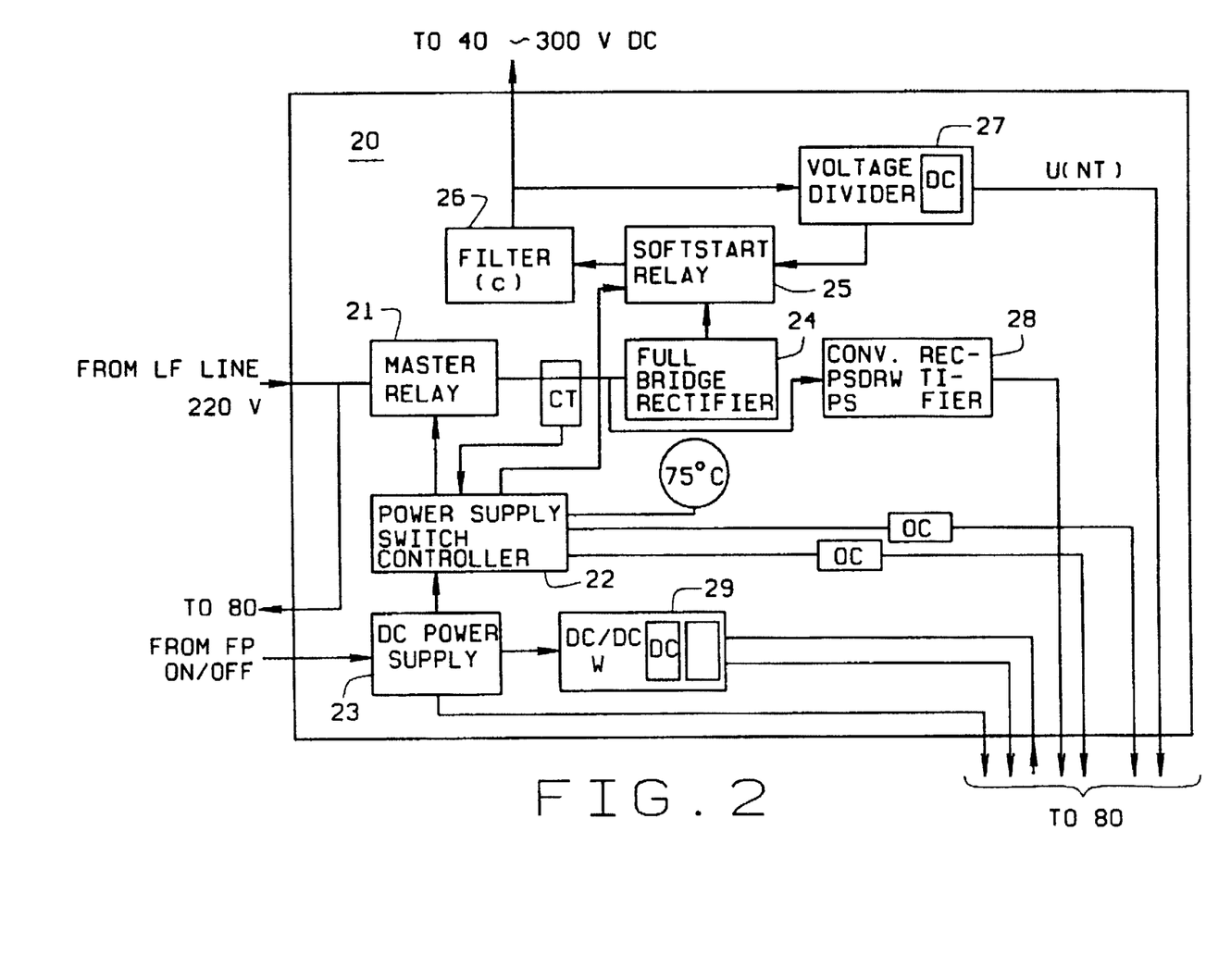
FIG. 2 is a block diagram of the main power supply.

FIG. 2 shows a block diagram of the line power supply 20. A master relay 21 allows to completely disconnect the line power supply from the line supply. This applies, for example, when the current consumption of the line power supply is too high. For registrating and monitoring protective functions, a power supply switch controller 22 is provided to which a 24 V voltage is applied by a DC power supply 23. The DC power supply is switched on by a key switch. The switch controller causes a switch ON-delay of approximately 1 s. This time period is required by the micro-controller for initializing. The operational voltage for the shifter 40 will be thus reached only then, when the micro-controller is set to a defined condition. This protects the end stage 50 against extreme conditions.

After the master relay 21 has been actuated, the voltage is then applied through a rectifier 24 to a ralay 25 to which a start resistor is connected in parallel. Filter condensator 26 will be charged through the start resistor. The voltage of the filter condensator 26 is passed to the relay 25 through a voltage divider 27. The relay 25 is actuated when the voltage applied thereto has obtained a predetermined value. The start resistor is then short-circuited by the relay 25 and thus the rectified voltage is directly fed to the filter condensator 26. This assures a slow rising of the supply voltage to be applied to the shifter 40 when activating the generator. The activating voltage U(NT) is fed back to the micro-controller 80 so that the shifter 40 will be controlled only then when U(NT) has reached the nominal magnitude.

The A.C. voltage upstream of the rectifier 24 is measured (CT) and the quantity measured is fed to a switch controller 22. When the current is too high, the switch controller 22 closes the master relay 21 and thus protects the generator against destruction. At the same time, the soft start ralay 25 will be closed thereby the inner resistance of the line power supply 20 becoming highly resistive.

The A.C. voltage at the input of the full-bridge rectifier 24 is fed to a second rectifier 28 which delivers a 12 V stabilized voltage driving the driving stage of the vibrator 40 as well as the driving stage of the end stage transistors 50.

The master ralay 21 is deactivated by the switch controller 22 when the temperature exceeds 75° C. measured below the printed board.

A further protection of the generator against overload is provided by measuring the current delivered to the ultrasonic transducer at the output of the match box 60. Hence, the micro-controller 80 can control the switch controller 22 free of a potential to initiate deactivating the master relay 21. Still further, for each fault of the micro-controller, the switch controller 22 is activated by a galvanically separate signal to disable the master relay 21.

In any case the switch controller 22 will further activate the parallel resistor of the soft start relay 22 to obtain a highly resistive internal resistance of the line power supply 20.

A D.C. transducer 29 to which a 12 V stabilized voltage is applied integrates the pulses delivered by the end stage 50 and delivers a potential-free voltage information to the micro-controller 80. This information enables the micro-controller to realize how far the voltage at the shifter output has been raised so that a reaction may be taken if required.

Figure 3:
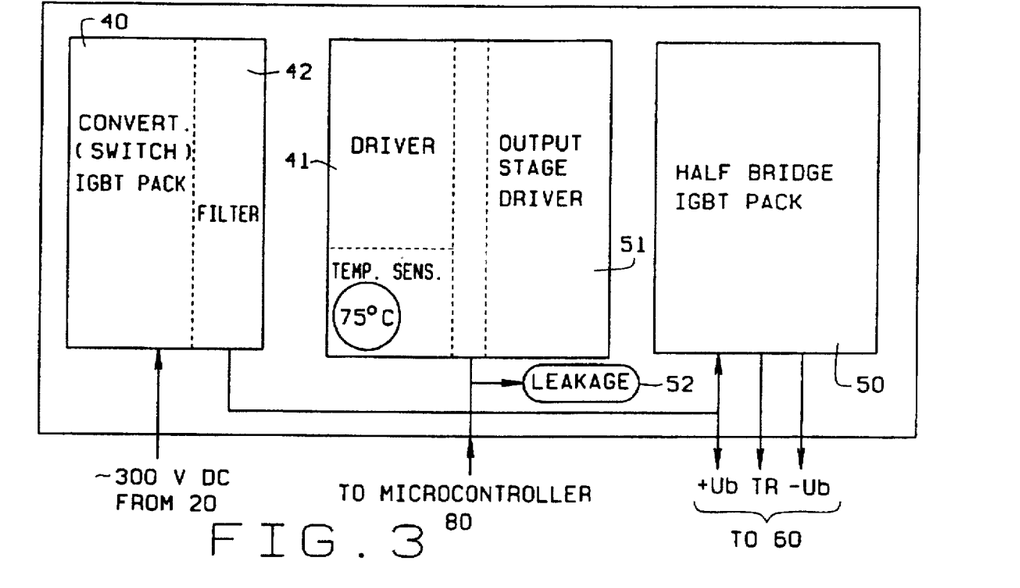
FIG. 3 is a block diagram of the end stage.

As shown in FIG. 3, the end stage comprises three components such as the shifter 40 chopping the voltage applied to into pulses and integrating again in condensators (not shown), further the switching transistors 50 for generating the oscillating frequency and the driver unit 41, 51 driving the switching transistors of the shifter 40 as well as the half bridge of the frequency determining module.

The micro-controller 80 determines the pulse width of the shifter pulses and thus the voltage potential available downstream of the filter 42 which potential in turn determines the power delivered by the half bridge (end stage 50) to the match box 60.

The voltage potential applied to the half bridge may be connected to ground through a drain resistor 52 as controled by the micro-controller. Accordingly, the current passing through the half bridge can be switched off very rapidly when required.

Figure 4:
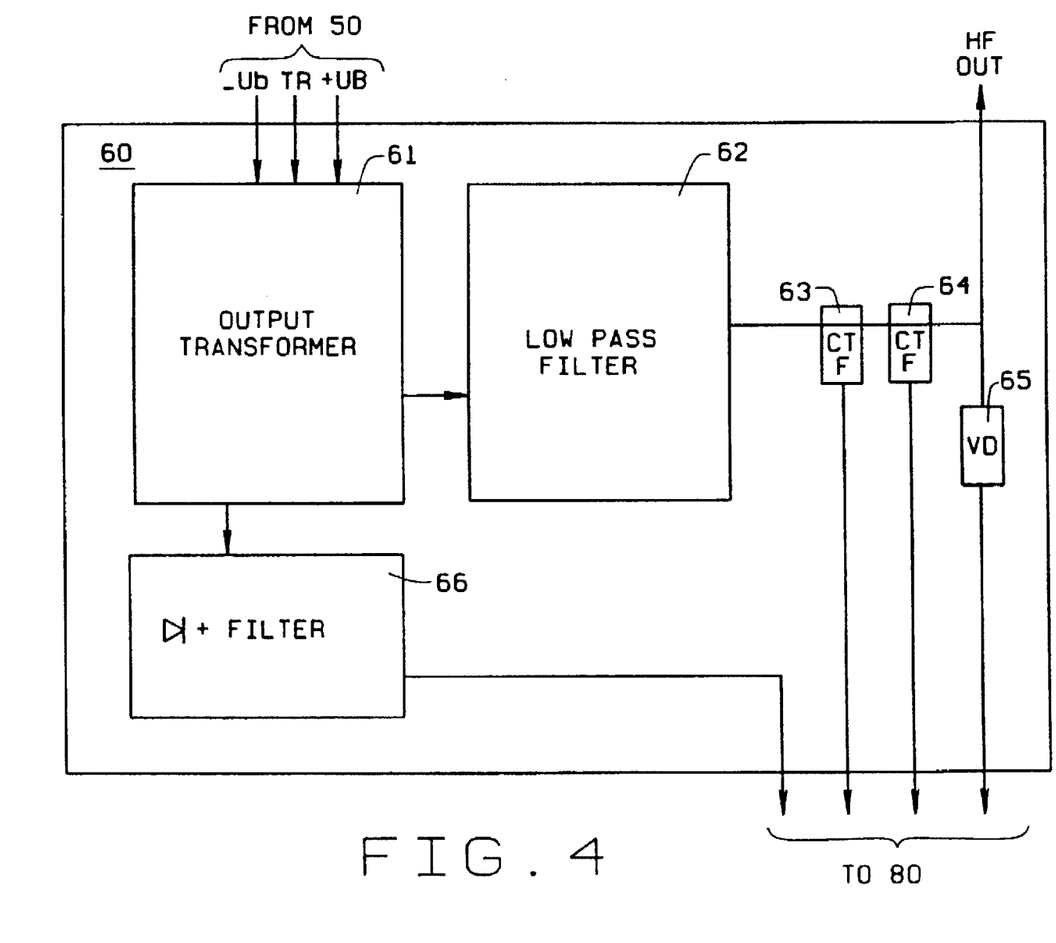
FIG. 4 is a block diagram of the match box.

The match box 60 is schematically shown in FIG. 4. The match box comprises an output transformer 61 for matching the impedance to the ultrasonic transducer, a low pass filter 62 for converting the pulses to a (sinusoidal) shaped oscillation and the measuring means 63,64,65 for the current and the voltage at the output to the ultrasonic transducer. The current of the current transformer 63 will be rectified and applied to the micro-controller 80. The D.C. current being a function of the frequency defines a characteristic wave form indicating the oscillation behaviour of the ultrasonic transducer. This information is required for setting the control parameters. Furthermore, the A.C. voltage is passed via a voltage divider 65 to the micro-controller 80 asserting the phase difference of both quantities such as current and voltage for controlling the optimum of the operating point during the welding process.

The output current of the match box 60 can be also measured by the current transformer 64 to deliver an A.C. signal. Furthermore, the secondary side of the transformer 61 may be monitored via a rectifier and filter 66.

Figure 5:
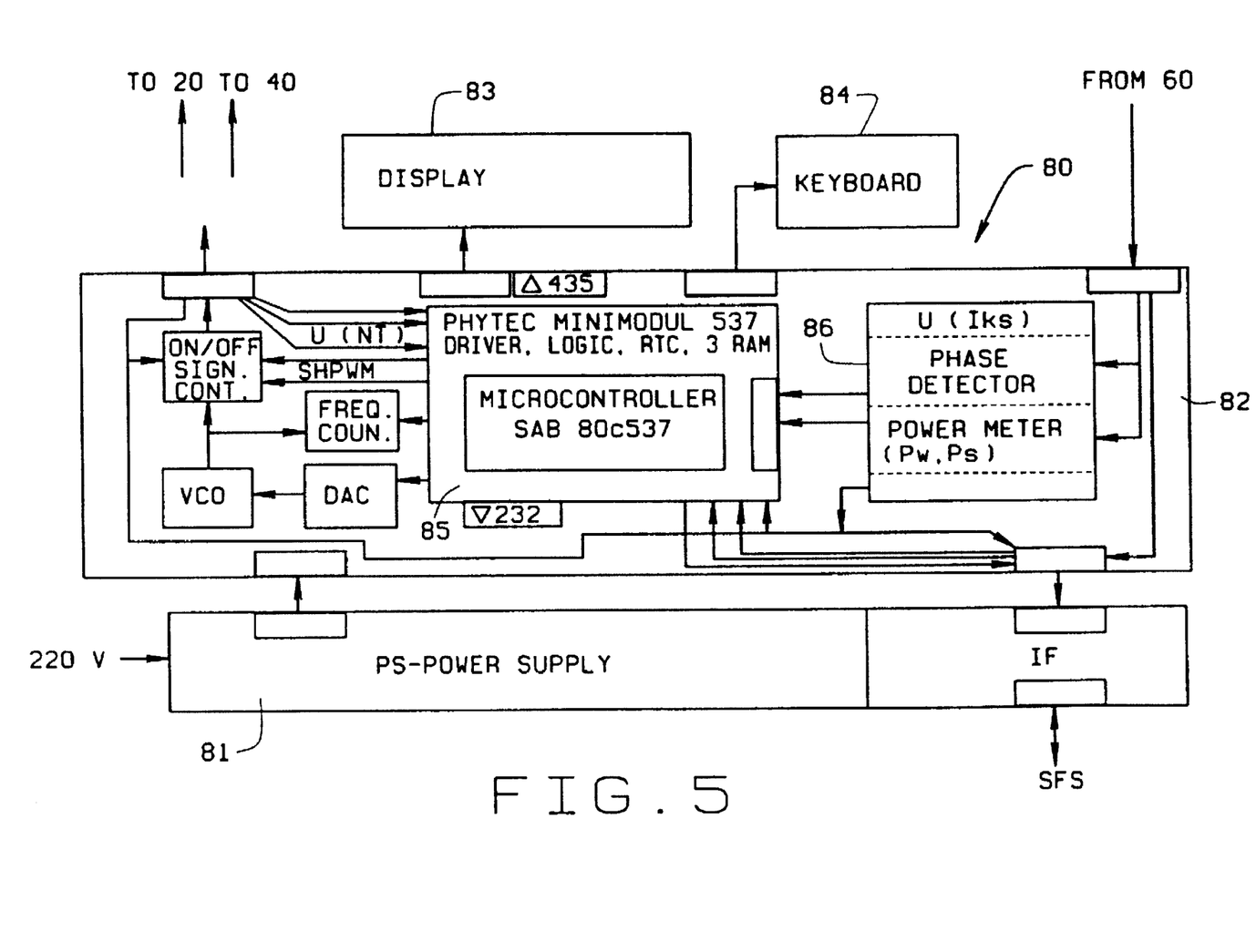
FIG. 5 is a block diagram of the micro-controller.

All substantial functions of the generator are controlled and monitored by a micro-controller 80. The individual functions are shown in FIG. 5.

The micro-controller 80 comprises a power supply 81 including signal outputs which are specific to customers, a controller board 82 including the microprocessor, a display 83 and a keyboard 84. The power supply 81 feeds a supply voltage to the controller board 82 and the display 84. The input and output signals to and from the microprocessor are looped across the power supply board 81. These signals include overload-, ready-, ultrasonic on-, emergency off- and trend signals for example, the trend signals of a quantity indicating its direction towards a specified limit. The signals: transformer current larger than nominal value and high-frequency indication are not monitored by the microcontroller, but are directly applied to an output. When the normal current is exceeded, the master relay 21 in the line power supply 20 is activated.

The high-frequency indication may be utilized by an external control as a monitoring quantity. The controller board 82 comprises a 8-bit-controller 85 including analog inputs for following information:

A voltage signal U(IW) which is proportional to the transformer current at the high-frequency output;

a voltage signal U(PHI) which is proportional to the phase difference PHI and which is generated by a circuitry measuring the phase between the current U(IW) and the voltage U(UW) at the output to the transducer;

the phase detector 86 further delivers an indication with respect to the direction of the phase angle so that the processor learns in which direction the phase zero crossing may be reached;

a voltage signal which is proportional to the alternating current and the high-frequency output; two voltage signals which are proportional to the effective or, respectively, apparent power delivered. These signals originate from a Watt-meter.

It should be understood that this amounts to the substantial advantages offered by the digital generator. The measured quantities above referred to may be utilized individually or in groups or even all for controlling the generator. The control process is based on a software program selecting and utilizing a variety of control quantities. The selection may be automatically performed or manually by the input of an operator.

Figure 6:
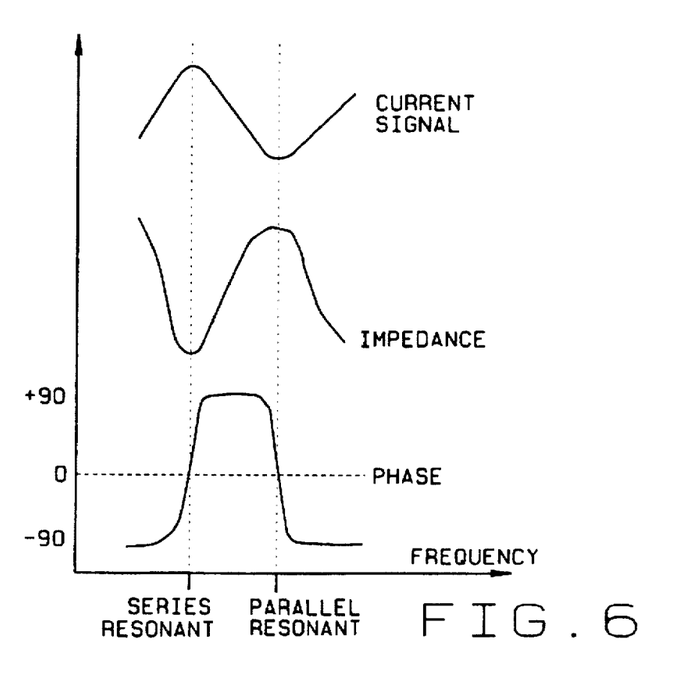
FIG. 6 is a wave form plot of the current, the impedance and the phase angle as a function of the frequency of the generator.

For example, a control is possible by utilizing the current signal as a control quantity. Ultrasonic transducers are regularly operated in parallel resonant condition of the impedance wave form where the current passing into the transducer is at a minimum. Hence, a control with respect to the current minimum is proposed. It can be shown, however, that this type of control with respect to the current minimum is inacurate. The reason for this should be seen in the rather flat wave form of the current as a function of the frequency close to the resonant point. FIG. 6 shows a typical wave form.

FIG. 6 further shows additionally a plot wave form of the impedance as the function of the frequency. It should be observed that the impedance wave form has a minimum and a maximum. The maximum corresponds to the parallel resonant condition of the transducer system. The minimum refers to the series resonant condition.

The phase wave form shown alike in the plot of FIG. 6 presents a substantially more accurate control quantity. The phase wave form includes a steep transition from −90° to +90°. A slight change of the frequency thus means a large change of the phase. The phase in the region of the resonant point is very small or, respectively, equal zero. This physically means that the shares of apparent and effective power are equal to each other.

In carrying out the software-controlled process or method of the present invention with the apparatus of this invention, certain benefits will be apparent to those skilled in the art.

First, it will be noted that a variety of control quantities or combinations thereof may be utilized for controlling. Primarily, the phase control is utilized based on its high accuracy. However, the phase control may be combined with the current, the voltage, the apparent or effective power each. Then the control gains the intelligence for discriminating the basic resonance oscillation and spurious resonances which should be not stimulated.

Before activating the generator, the software scans the current wave form of the transducer as a function of the frequency across a selected range. The information gained by this scanning operation will be utilized for calculating the distance between the series and parallel resonance determining the coupling factor of the system. Depending on this distance, the size of the increments of changing the frequency and the measuring time per frequency measurement in searching for the phase zero-crossing and thus the controlled speed will be determined. For a very steep transition between the series and parallel resonance, a smallest possible increment is selected to hit the zero-crossing as accurate as possible. For rather flat transitions, the increments are selected to be larger to find the phase zero-crossing as fast as possible. This dynamic matching of the frequency resolution adapts the control time to the acoustical characteristics of the resonance system. Furthermore, the software selects the quantity of the parallel resonance from the current spectrum and determines the starting frequency therefrom which is used to determine the phase zero-crossing. This starting frequency is preferably selected to be at a value so far above the parallel resonance that after the horn has made contact causing a frequency shift towards higher values, the starting frequency still lies above the parallel resonance. This is the frequency from which it is started to perform the first welding process. At the time of the second welding process, the software already corrects the location of the starting frequency which is then selected to be some 10 Hz only above the parallel resonance which results from the horn making contact. Thereby the time period up to determining the phase zero-crossing is minimized. A further substantial benefit of this method is the automatic selection of the tuning range thus eliminating a manual setting on the one hand and, on the other hand, broadening the specific limits for the permissible frequency range of the transducer system.

The controller discriminates two phases, the starting phase and the welding phase. The starting phase is different with respect to the welding phase in that the welding power is generated in steps up to the maximum value in the welding phase. The step size and time period up to the next step are selectable. This allows to generate any type of rising ramp. The rising ramp is of importance when acoustical stress in the horn shall be prevented. The control during the starting phase is different from that in the welding phase by defining a threshold value for the phase angle which interrupts the control process when the phase angle drops below the threshold, then further activating the next following power step. This allows to accelerate the control process as the phase must not cross zero. This type of control provides for the highest stability in stimulating the oscillation since it results in a rapid dynamic process requiring a fast reaction time. Since the reaction time is determined by the speed of the micro-controller as much as by the resolution in the frequency range, the method allows to master the fast frequency changes of the resonant frequency in the raising ramp of the welding pulse. A slight increase of the apparent power because of the phase angle which is not controlled to be exactly zero, has no meaning since the rising flank generally lasts less than 20% of the welding time.

After reaching the maximum welding power, the control then activates the phase zero-crossing control in order to ensure a minimum apparent power or, respectively, the minimum reactive current in the end stage. The phase zero-crossing is defined by the directional signal which is applied together with the phase angle by the phase circuitry. This welding-phase-responsive control is possible only by means of a software controlled process.

There are some ultrasonic systems having no phase zero-crossing. In order to simulate a zero-crossing of the phase with those systems, the micro-controller 80 automatically determines a phase offset and checks whether a signal in response to direction continues. When the sign of the directional responsive signal is inversed, a zero-crossing of the phase is simulated. Even when a directional signal does not occur, the controller 80 automatically initiates a phase offset. The method thus allows to operate acoustic systems as well which cannot be operated by analog phase controls of the prior art.

The oscillation amplitude is one of the significant parameters defining the tearing strength of the welding seam. Therefore, the generator allows to automatically control the amplitude during the welding process or to determine a certain amplitude profile. According to the invention, this amplitude control is performed by driving the shifter. Hence, the generator may be integrated in a continuously operating process control correlating the quality of the welding seam to the significant parameters.

The software control generator first allows to provide an optimum match with respect to the application. For inline systems such as packing machines, the software automatically realizes the machinery cycle and adjusts the control accordingly. This is possible since the touch-down of the transducer (horn making contact) may be realized. The generator delivers a fixed frequency referred to as touch-down frequency which is above the parallel resonance. The quantity of the touch-down frequency is determined by the generator from the current spectrum once determined. The amplitude will be held very small to protect the transducer against undesired stress. At the time of touch-down the resonance frequency shifts towards higher values and passes the preset frequency. The phase measuring thus shows a phase jump from 90° towards 0 during a very short period of time. This jump will be detected and indicates the touch-down. Thereafter, the control is initiated as above described. After terminating the welding time, the fixed frequency above the parallel resonance is again delivered with a small amplitude. After terminating the holding time and lifting the horn, the parallel resonance jumps back to its starting point and passes again the fixed frequency value but this time from above. The generator realizes again that the horn has been lifted off and now the distance between the welding pulses and the time period of the welding pulses can be determined and stored. To keep the loading of the generator to a minimum, the touch-down frequency above the parallel resonance is activated and readjusted just some 10 mm/s before touch-down, since small variations of the cycle rate are possible with non-SPS controlled systems. Due to this intelligent feature, feeding and adjusting a separate trigger signal is eliminated. Furthermore, this method ensures that ultrasonic energy is applied only when a contact to the material to be welded exists. Hence, unnecessary stress in the end stage and the horn are prevented.

The interval between the touch-down frequency and the parallel resonance while in idle condition determines the force with which the ultrasonic energy is introduced. The touch-down force is a function of the distance between the touch-down frequency and the parallel resonance when the system is in idle condition. Hence, the touch-down force and thus the triggering force with which the power shall be introduced can be determined by selecting the touch-down frequency. According to the invention, an installment of a force sensor for measuring the triggering force is not required. This is meaningfull for those applications which require a certain triggering force due to their structural geometry.

The interval between the touch-down frequency and parallel resonance will be varied according to temperature. To ensure a constant interval and thus a constant triggering relationship, the touch-down frequency will be readjusted according to the invention by measuring the converter current. The converter current is at a minimum at the resonance point and progressively changes with increasing distance from the resonance point.

The horn is subjected to a substantial acoustical stress when it experiences a metal contact with the anvil when no material to be welded is present or when it is cut through. The generators of the analog operating type do not allow to realize the metal contact, thus producing ultrasonic energy even in this case. However, the software control generator may discriminate a metal contact by a substantial frequency shifting of some 100 Hz caused thereby by setting a frequency limit, thus preventing introducing energy.

The software control for phase zero-crossing shows smaller variations than a conventional voltage-loop-control. It can be shown that smaller variations of the control result in applying more energy to the welding seam.

Voltage variations of the power line may be leveled out by the generator in driving the shifter. When the power line falls below 10%, for example, the generator discriminates this condition based on the effective power delivered and opens the shifter still further, i.e. more energy is delivered to the end stage.

A further advantage is obtained by on-line including external parameters prevailing at the welding machine such as pressure, distance etc. during the welding process to optimize the quality of the welding seam. Methods using an external controller control or adjust those parameters only after the welding process is performed.

Maintaining the power delivered to the ultrasonic transducer during the welding process is possible by controlling the pulse width generated by the shifter. This results in a constant welding amplitude for a constant pressure.

The software allows to automatically select the appropriate control parameters. When the phase control is not able to stimulate the acoustical system in use, even by performing the phase offset method, a flag may be set in the input menue of the generator to switch over to current minimum control. Accordingly, resonant frequencies may be stimulated having a current minimum disregarding the type of those frequencies. Principally, the generator may be utilized not only as a welding generator, but is used for ultrasonic cleaning as well. The specific requirements in ultrasonic cleaning such as 100% duty cycle, frequency sweep, determining the proper resonance point and modulating the amplitude for degasing the cleaning fluid may be obtained by modification of the software and may be selected by the primary menue. Listing these benefits shows that the generator according to the invention may be universally applied due to its hardware and software structure.

We claim:

1. The method of operating a a generator supplying electrical high frequency power to an electroacoustic transducer operable at a predetermined ultrasonic frequency at which said transducer and a horn coupled thereto art rendered resonant for transmitting ultrasonic energy to a workpiece which is in forced contact with said horn, and wherein the phase angle between the current and the voltage of said power is sensed and digitally processed for controlling the frequency and power supplied by said generator to said transducer, said method comprising the steps of:

with said horn free of contact with a workpiece, controlling said generator to produce a swept frequency power to said transducer for determining the frequency range between the series resonant frequency and the parallel resonant frequency of said transducer and said horn coupled thereto by sensing the maximum and the minimum current values of the electrical current supplied to said transducer;

controlling said generator to supply initially to said transducer power having a predetermined start frequency which is above that of said parallel resonant frequency under the conditions when said horn is free of contact with a workpiece and above the parallel resonant frequency under the conditions when said horn is in forced contact with a workpiece; and in response to the subsequent detection of contact between said horn and a work piece, controlling said generator to lower in discrete steps the frequency of the power supplied to said transducer from said start frequency to the then prevailing parallel resonant frequency as sensed by a substantially zero phase angle, the quantity of discrete steps and at the speed of step changing being responsive to said frequency range.

2. The method of claim 1, wherein contact between said horn and said workpiece is detected by observing a predetermined increase in the parallel resonant frequency of the transducer and horn combination.

3. The method of claim 1 wherein, responsive to said horn being in forced contact with said workpiece, adjusting said predetermined start frequency to be within a small fraction greater than said prevailing parallel resonant frequency, thereby minimizing the time required to reduce the frequency of the power supplied by said generating to said transducer and horn combination during subsequent contacts with workpieces.

4. The method of claim 3 wherein said small fraction greater than said prevailing parallel resonant frequency is about 10 Hz.

5. The method of claim 1 wherein, responsive to said horn being in contact with a workpiece, controlling said generator to increase the power supplied to said transducer in discrete steps from a minimum to a predetermined maximum.

6. The method of claim 5 wherein during the increase of power, responsive to said phase angle dropping below a predetermined threshold established from said frequency range, said generator is controlled to supply power to said transducer at said next higher discrete step, thereby preventing said phase angle from reaching a zero-crossing, while providing high transducer stability.

7. The method of claim 5 wherein, responsive to said horn being in contact with a workpiece and said power to said transducer attaining maximum, controlling said generator to maintain maximum power by sensing phase angle deviations greater than a predetermined magnitude away from said substantially zero phase angle and altering said generator output until said substantially zero phase angle is restored.

8. The method of claim 7 wherein said phase angle deviations are observed by sensing said phase angle and the direction of said phase angle offset from said zero-crossing point.

9. The method of claim 7 wherein, responsive to no actual zero phase angle existing in the system, controlling said generator to maintain maximum power at a simulated zero phase angle, said simulated zero phase angle established by sensing the point at which the direction of phase angle inverts.

10. The method of claim 5 wherein, responsive to said horn being subsequently removed from forced contact with a workpiece, controlling said generator to decrease the power supplied to said transducer to said minimum level and to re-establish the supplying of said minimum power at said predetermined start frequency, awaiting next establishment of contact between horn and workpiece.

11. The method of claim 10 wherein subsequent removal of said horn from forced contact with said workpiece is detected by sensing a predetermined decrease in said parallel resonant frequency.

12. The method of claim 5 wherein, responsive to the observation of a predetermined increase in said parallel resonance frequency of said transducer and horn combination resulting from said horn contacting metal, controlling said generator to decrease the power supplied to said transducer to said minimum level and to re-establish the supplying of said minimum power at said predetermined start frequency, awaiting next establishment of contact between horn and workpiece.

13. The method of claim 5 wherein, responsive to said horn being in contact with a workpiece and said power to said transducer attaining maximum, controlling said generator to maintain maximum power delivery to said transducer by maintaining the current of said delivered maximum power at a minimum.

14. The method of claim 5 wherein, responsive to said horn being in contact with said workpiece, and said power to said transducer attaining maximum, controlling said generator to alter the oscillation amplitude of said transducer and horn assembly corresponding to a predetermined amplitude profile.

15. The method of claim 1 wherein, in addition to the phase angle between the current and the voltage of said power, one or more additional control parameters are sensed and digitally processed for controlling the frequency and power supplied by said generator to said transducer.

16. The method of claim 15 wherein temperature is sensed and digitally processed for controlling the frequency and power supplied by said generator to said transducer.

17. The method of claim 15 wherein generator output current is sensed and digitally processed for controlling the frequency and power supplied by said generator to said transducer.

18. The method of claim 15 wherein generator output current is sensed and digitally processed for controlling the frequency and power supplied by said generator to said transducer.

19. The method of claim 15 wherein generator apparent power output is sensed and digitally processed for controlling the frequency and power supplied by said generator to said transducer.

20. The method of claim 15 wherein generator active power output is sensed and digitally processed for controlling the frequency and power supplied by said generator to said transducer.

21. The method of claim 15 wherein workpiece pressure is sensed and digitally processed for controlling the frequency and power supplied by said generator to said transducer.

22. The method of claim 15 wherein workpiece distance is sensed and digitally processed for controlling the frequency and power supplied by said generator to said transducer.

* * * * *